United States Patent
Gray et al.

[11] Patent Number: 5,992,709
[45] Date of Patent: *Nov. 30, 1999

[54] DISPENSER FOR VISCOUS LIQUIDS

[75] Inventors: Gordon W. Gray, Princeton; Donald H. Peoples, Trenton, both of N.J.

[73] Assignee: Princeton University, Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/930,141

[22] PCT Filed: Apr. 17, 1996

[86] PCT No.: PCT/US96/05278

§ 371 Date: Oct. 9, 1997

§ 102(e) Date: Oct. 9, 1997

[87] PCT Pub. No.: WO96/33127

PCT Pub. Date: Oct. 24, 1996

[51] Int. Cl.[6] .................................................. B67D 3/00
[52] U.S. Cl. ........................... 222/485; 141/243; 141/237
[58] Field of Search ................................. 222/485, 486; 141/237, 236, 242, 243

[56] References Cited

U.S. PATENT DOCUMENTS

| | | | |
|---|---|---|---|
| 538,941 | 5/1895 | Wolven | 222/485 |
| 581,847 | 5/1897 | Carvin | 141/237 X |
| 1,139,269 | 5/1915 | Goodman et al. | 222/485 |
| 1,294,579 | 2/1919 | Waring | 141/242 |
| 1,303,218 | 5/1919 | Esselmann | 222/485 X |
| 1,882,668 | 10/1932 | McCabe | 222/485 X |
| 2,749,005 | 6/1956 | Plusquellic | 222/485 X |
| 3,314,575 | 4/1967 | Graham | 222/485 X |
| 3,633,489 | 1/1972 | Spoelhof | 222/485 X |

FOREIGN PATENT DOCUMENTS

| | | | |
|---|---|---|---|
| 584227 | 8/1933 | Germany | 141/243 |
| 18975 | 2/1908 | Norway | 141/237 |
| 134327 | 1/1952 | Sweden | 141/242 |
| 1783306 | 12/1992 | U.S.S.R. | 222/485 |
| 14929 | 6/1909 | United Kingdom | 141/237 |
| 184850 | 8/1922 | United Kingdom | 141/237 |

*Primary Examiner*—Kenneth Bomberg
*Attorney, Agent, or Firm*—Law Offices of Jane Massey Licata

[57] ABSTRACT

A viscous liquid dispenser (1) having a dispensing container (6) with a dispenser bottom (2) having a multiplicity of drainage holes (3) a grooved track (5) within the inside wall of the dispensing container parallel to and above the dispenser bottom, and a slidable damming plate (4) having a multiplicity of drainage holes (3) which is mounted in the grooved track and is capable of sliding between a closed position (FIG. 2) wherein the drainage holes of the slidable damming plate and the dispenser bottom are not aligned and an open position (FIG. 3) wherein the drainage holes of the slidable damming plate and the dispenser bottom are aligned is provided.

8 Claims, 6 Drawing Sheets

DISPENSER FOR VISCOUS LIQUIDS

BACKGROUND OF THE INVENTION

There is a great need for a device which rapidly and efficiently dispenses viscous liquids into containers for a great variety of applications. This need is especially great in Drosophila sp. laboratories where large volumes of hot media are dispensed into vials on a daily basis. There is also a need for such a device in microbiological laboratories which require large volumes of hot media for culture vials and plates. Of course, such a need also exists in other areas such as the cosmetic industry and food industry. Prior art devices for dispensing viscous liquids are relatively expensive, have many moving parts and may require energy sources to operate. Prior art media dispensing devices include peristaltic and piston driven pumps.

The present invention, however, rapidly and efficiently dispenses viscous liquids into selected containers in only a fraction of the time and cost required by piston or peristaltic pump devices.

SUMMARY OF THE INVENTION

The invention is a device comprised of a dispensing container having either a fixed or removable dispenser bottom with multiple drainage holes adapted to correspond to selected pre-packaged containers or sorted containers to be filled. A damming plate having drainage holes therein and slidable on a grooved track above said dispenser bottom is also included. While in the closed position, neither set of drainage holes (in the damming plate or the dispenser bottom) align which retains the viscous liquid in the container. In the open position, the drainage holes in the damming plate and dispenser bottom are aligned to allow the gravity transfer of the liquid into the selected containers placed below the device.

DETAILED DESCRIPTION OF THE INVENTION

Figure 1A:
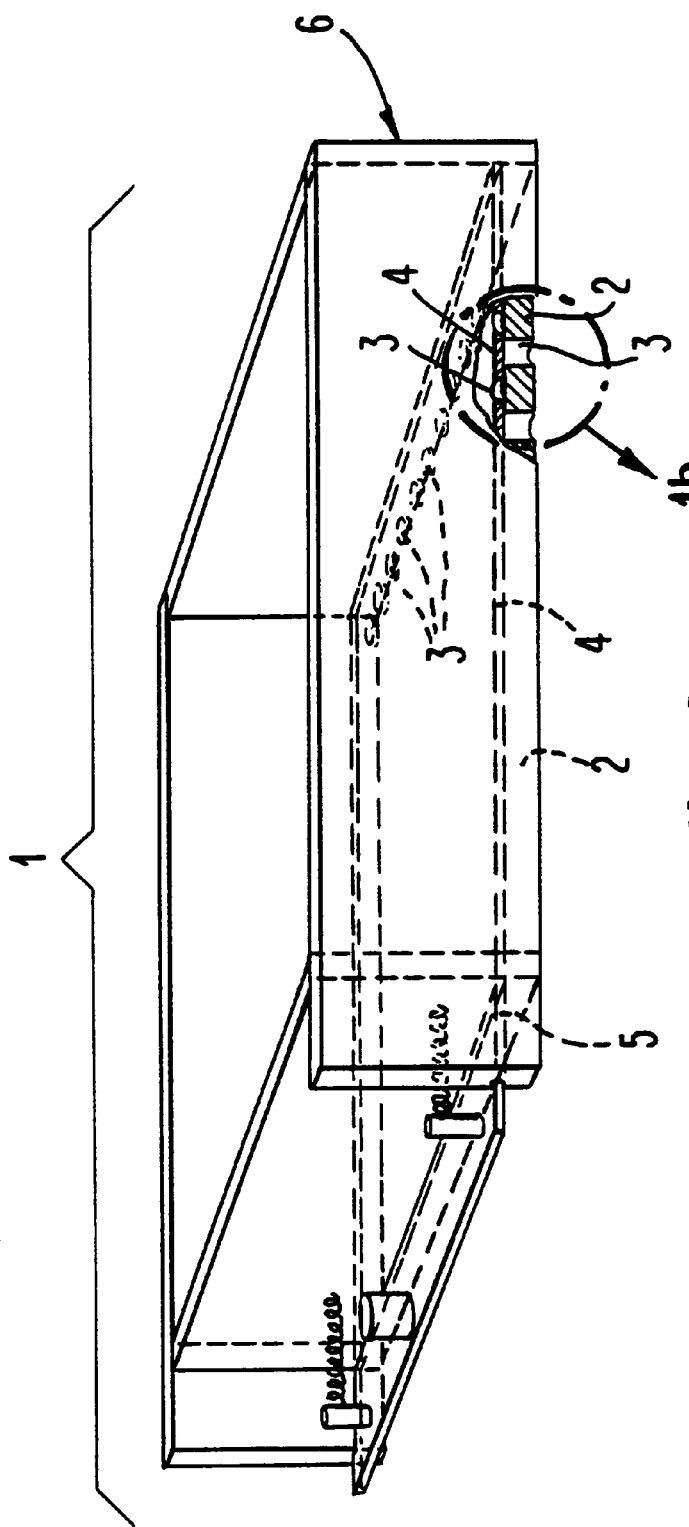
FIG. 1a is a side view of a viscous liquid dispenser illustrating the damming plate in a closed position.
Figure 1B:
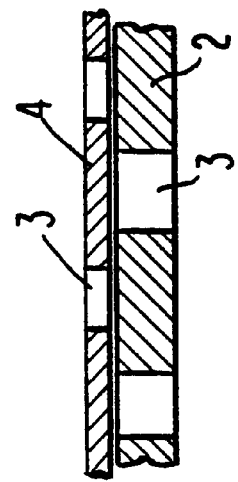
FIG. 1b is an enlarged view of the viscous liquid dispenser of FIG. 1a which shows the damming plate in a closed position with respect to the bottom of the dispenser.
Figure 2:
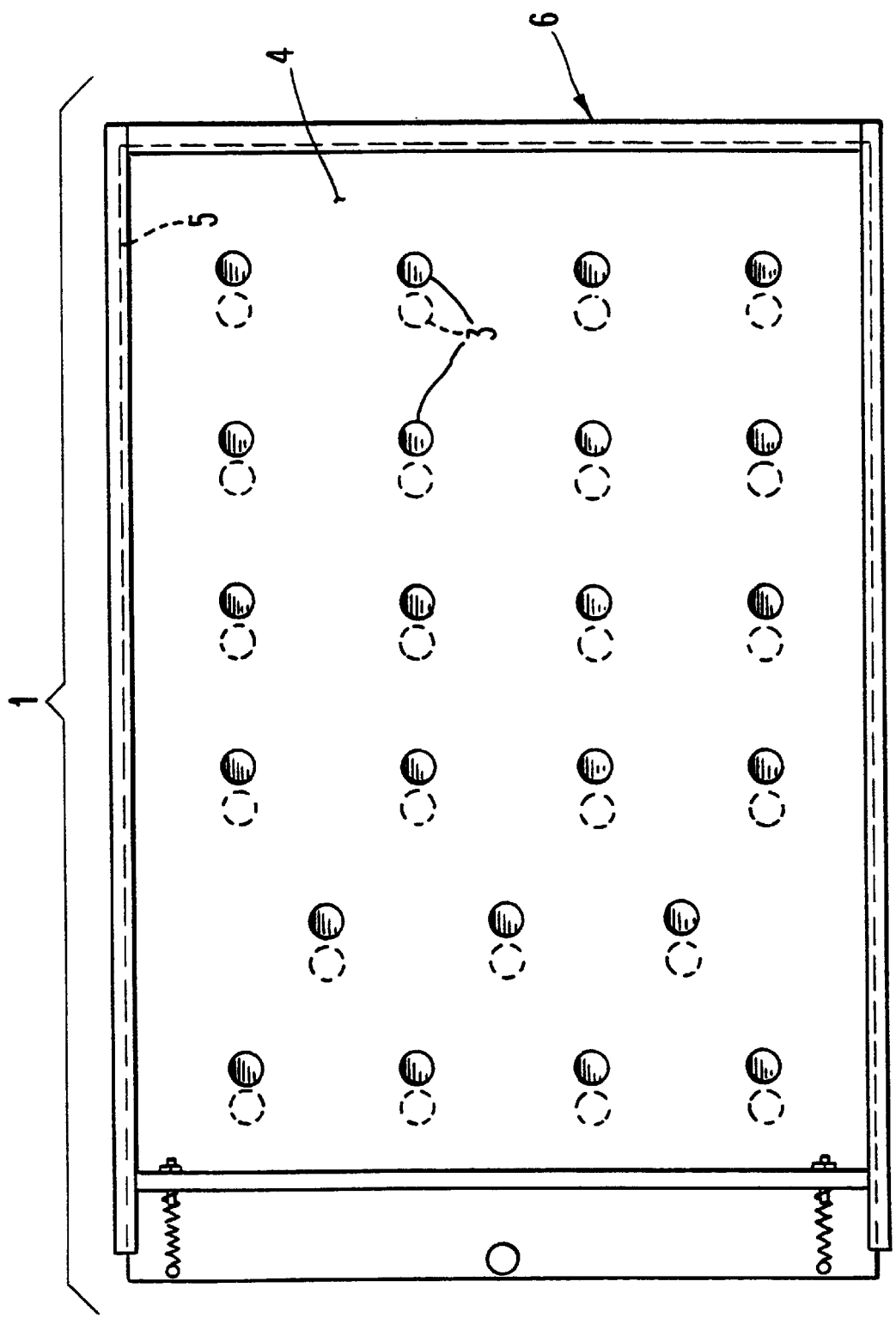
FIG. 2 is a top view of the viscous liquid dispenser provided in FIG. 1.
Figure 3:
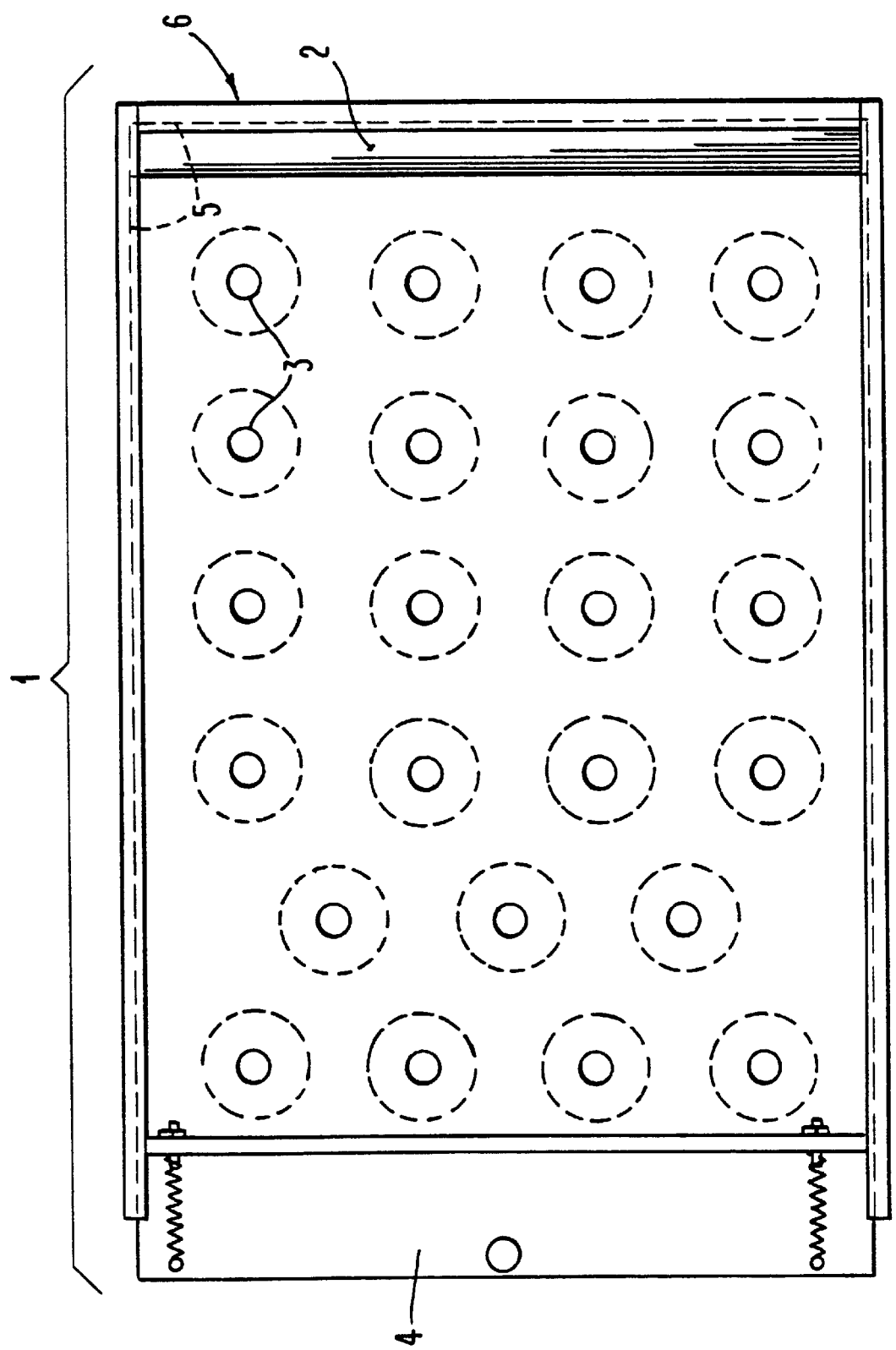
FIG. 3 is a top view of the viscous liquid dispenser illustrating the damming plate in an open position.

Referring now in specific detail to the drawings, in which like reference numbers identify similar or identical elements, FIGS. 1–5 illustrate embodiments of a media dispenser shown generally at 1. In simplest terms, the viscous liquid dispenser 1 can be broken down into a dispensing container 6 having a dispenser bottom 2 with a multiplicity of drainage holes 3, a damming plate 4 with a multiplicity of drainage holes 3 and a grooved track 5. The embodiment depicted by FIGS. 1–3 is adapted for and particularly useful in dispensing media into 23 different containers, the openings of which are depicted in FIG. 3 as dotted lines. However, as will be clear to one of skill in the art, the shape of the dispensing container and the number of drainage holes 3 can be easily altered in both the dispenser bottom 2 and the damming plate 4 so that the configuration and number of containers which can be filled at the same time can be altered. In this viscous liquid dispenser, the damming plate 4 is slidably mounted in a grooved track 5 along the inside wall of the dispensing container 6 just above the dispenser bottom so that the damming plate 4 can be slid between an open position wherein the drainage holes 3 of the damming plate 4 are aligned with the drainage holes 3 in the dispenser bottom 2 as depicted in FIG. 3 and a closed position wherein the drainage holes 3 of the damming plate 4 are not aligned with the drainage holes 3 of the dispenser bottom 2 as depicted in FIG. 2.

The viscous liquid dispenser 1 of the present invention is designed for dispensing any viscous liquid into multiple containers simultaneously. The dispenser of the present invention is especially useful in dispensing hot media for laboratories where large numbers of containers containing media are used, for example in labs where Drosophila sp. are studied. It is also useful for the rapid dispensing of bacterial media. Of course, as will be obvious to one of skill in the art, the dispenser is useful in any area wherein there is a need to dispense a viscous liquid into multiple containers simultaneously, for example in the cosmetic or food industry.

Figure 4:
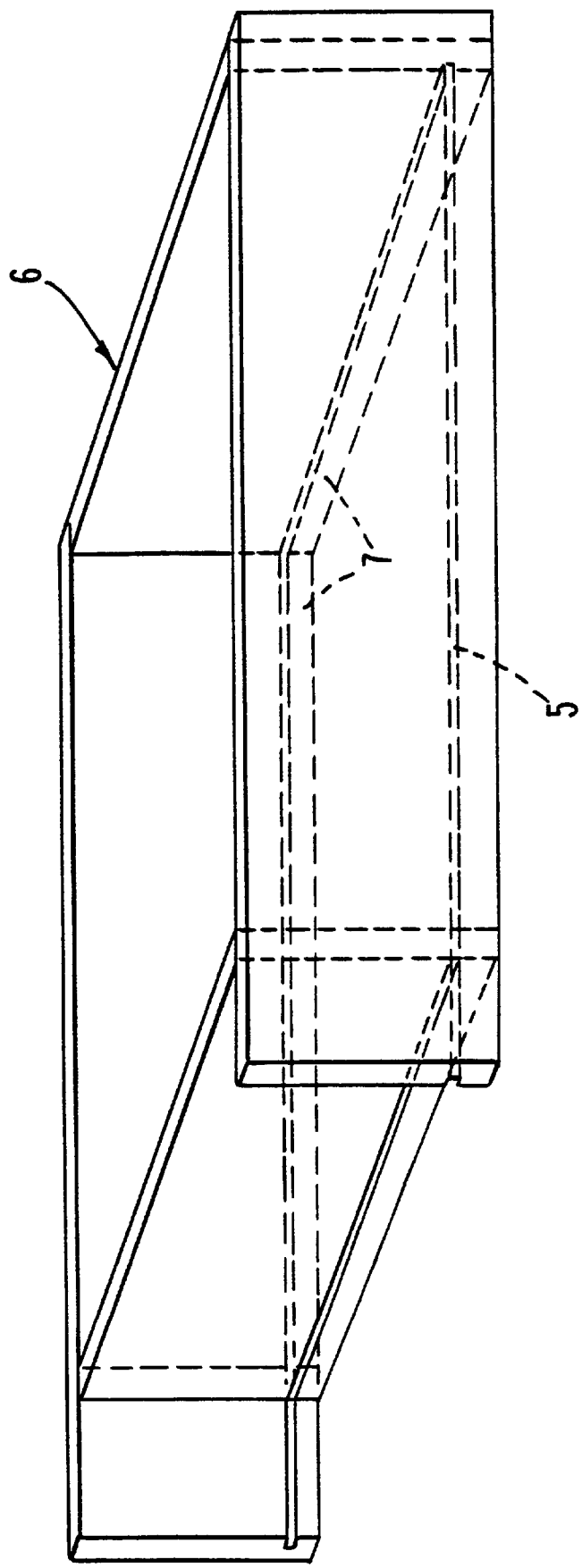
FIG. 4 is a side view of a preferred embodiment of a dispensing container having a dispenser bottom which is removable and can be interchanged with other dispenser bottoms having different configurations, numbers or sizes of drainage holes. In this Figure, the dispenser bottom has been removed.
Figure 5A:
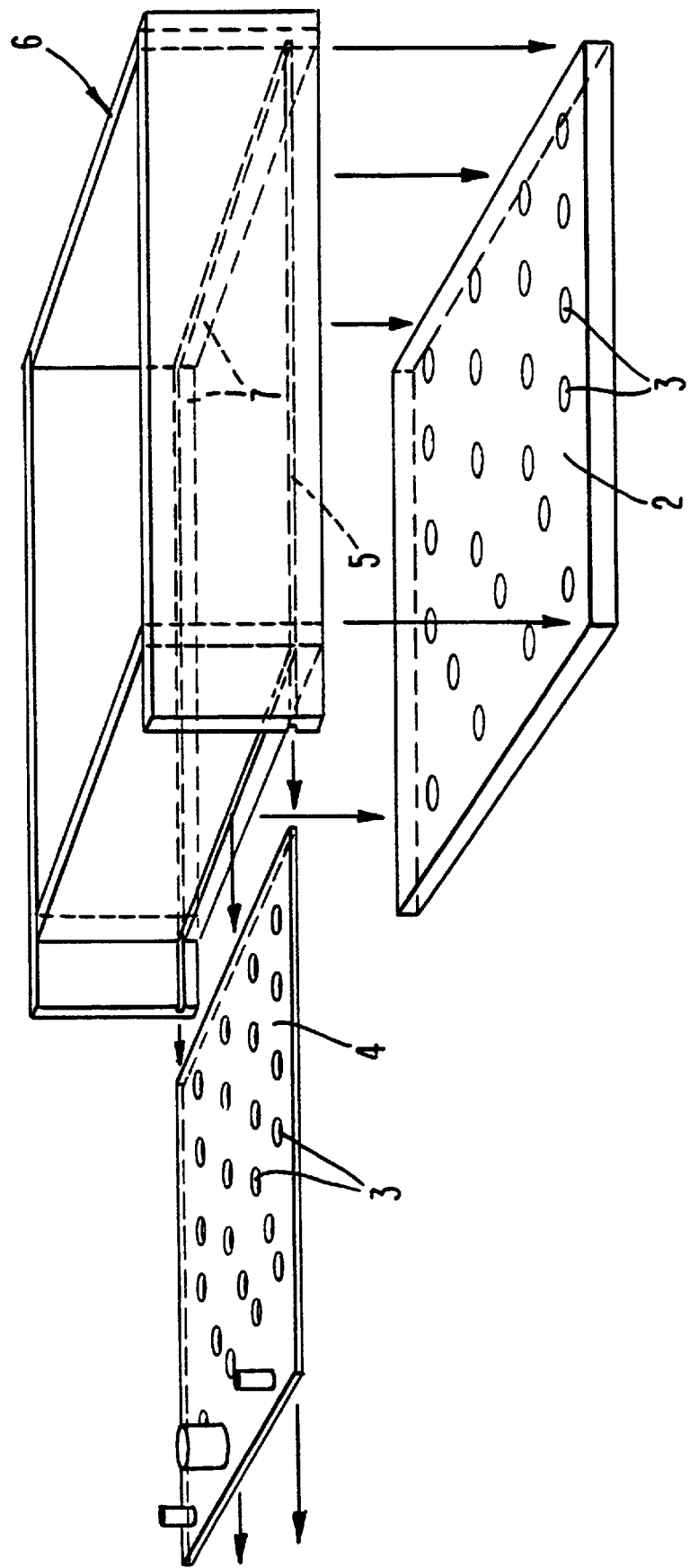
FIG. 5a is a side view of a preferred embodiment of a viscous liquid dispenser having a first configuration of an interchangeable, removable dispenser bottom and an interchangeable, slidable damming plate.
Figure 5B:
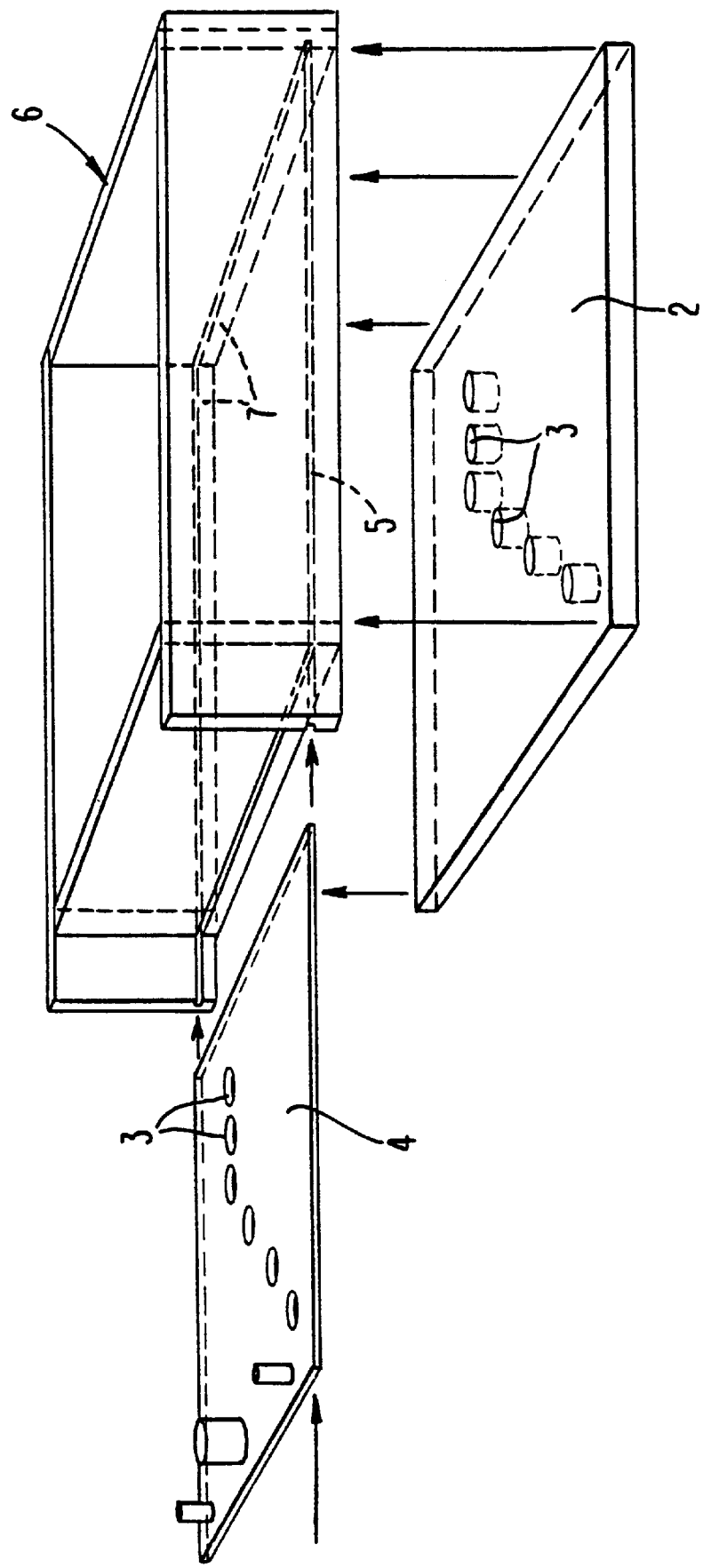
FIG. 5b shows replacement of the first configuration of the interchangeable, removable dispenser bottom and interchangeable slidable damming plate depicted in FIG. 5a with a dispenser bottom and damming plate having a second configuration.

The dispensing container 6 of the viscous liquid dispenser 1 of the present invention can have any size and shape adapted for selected containers to be filled with the liquid. In a preferred embodiment the dispensing container is comprised of a heat-retaining material, such as aluminum or stainless steel. Other materials which may be used include, but are not limited to, copper, stable plastics and ceramic. Appropriate materials may be selected in accordance with the viscous liquid which will be dispensed. For example, if the viscous liquid must be sterile, a material which is suitable for autoclaving may be selected. The dispensing container 6 has a dispenser bottom 2 having a multiplicity of drainage holes 3 therein. In one embodiment, as depicted in FIGS. 1–3, the dispenser bottom 2 is fixed and continuous with the sides of the dispensing container 6. In another embodiment, as depicted in FIGS. 4–5, the dispenser bottom 2 is removable and can be interchanged with other dispenser bottoms having different configurations, numbers or sizes of drainage holes. In this embodiment, the dispenser bottom slides into a dispenser bottom groove 7 along the bottom of the inside walls of the dispensing container so that it can be interchanged with other dispenser bottoms. In this embodiment, the slidable damming plate 4 is also interchangeable so that the configuration, number and size of drainage holes in the dispenser bottom 2 and damming plate 4 can be matched accordingly. On the inside wall of the dispensing container 6 is a grooved track 5 running parallel and just above the dispenser bottom 2. A slidable damming plate 4 having a multiplicity of drainage holes 3 which is capable of moving between an open and closed position is mounted in the grooved track 5 parallel to and above the dispenser bottom 2. The device has an open and a closed position. In the closed position, the drainage holes 3 in the damming plate 4 and the dispenser bottom 2 are not aligned so that any liquid placed in the dispensing container 6 is retained in the dispensing container 6. In the open position, the damming plate 4 is slid to a position wherein the drainage holes 3 in the damming plate 4 and the dispenser bottom 2 are aligned so that any liquid placed in the dispensing container 6 can flow through the drainage holes 3 and into containers placed beneath the viscous liquid dispenser 1 and aligned with the drainage holes 3 in the dispenser bottom 2.

In one embodiment, the viscous liquid dispenser of the present invention is adapted to fit snugly over prepackaged disposable vials such as disposable polystyrene vials (AS-516, 10×10 row tray configuration; Applied Scientific, San Francisco, Calif.). Applied Scientific and many other vendors produce various polystyrene and K-resin prepackaged vials to which the device of the present invention can be readily adapted.

In another embodiment, the viscous liquid dispenser is adapted to fit over glass vials such as 8-dram diameter Kimball Kimax vials. In this embodiment, the vials can be stacked, for example, in 8×19 rows in a stainless steel #3 mesh, 18 gauge welded wire basket, 14½ inches wide×10½ inches deep×2½ inches high and having a 6 gauge top rim (Allentown Caging Co., Inc. (ACE), Allentown, N.J.). The device can also be adapted to fit over prepackaged Kimax vials, 144 per pack (model #60931-8, Fisher Scientific, Pittsburgh, Pa.).

In yet another embodiment, the viscous liquid device is adapted to fit over bottles, such as one-half pint bottles, which have been stacked in wire baskets.

However, as will be apparent to one of skill in the art, there are many types and sizes of glass and plastic containers available to which the device can be adapted based upon the teachings of the invention. Prepackaged containers can be filled using the device of this invention which is adapted to be of the size and shape dictated by the packaging dimensions. Bulk containers can be stacked to any dimension needed by the user and the device adapted to a size and shape of appropriate dimensions.

In another embodiment, petri dishes of any size and shape can be filled by placing the device upon a slightly elevated stationary or rolling platform. The petri dishes can be placed on trays which are slidable under a stationary platform, or the device can be rolled down a table top rowed with dishes to achieve the same effect. In either case, the device is adapted to a size appropriate for the dishes to be filled. Examples of petri dishes which can be filled using the present invention include, but are not limited to, circular dishes with a diameter and depth in millimeters of 35×10, 50×9, 60×15, 100×15, 100×20 and 150×15 and square dishes 100×15 mm in size.

The device of the invention provides a rapid gravity transfer of viscous liquids into multiple containers simultaneously in a fraction of the time required by other devices. For example, the device can dispense media into vials of 10 to 15 ml or bottles of 35 to 50 ml at a rate of 4 to 15 seconds, as compared to 2 to 4 minutes for peristaltic or piston driven pump devices. Accordingly, the present invention provides a more efficient and cost effective device for dispensing viscous liquids into a variety of containers.

What is claimed:

1. A viscous liquid dispenser comprising:
   a) a dispensing container having an inside and outside wall and a dispenser bottom;
   b) said dispenser bottom having a multiplicity of drainage holes;
   c) a grooved track within said inside wall of said dispensing container parallel to and above said dispenser bottom; and
   d) a slidable damming plate having a multiplicity of drainage holes mounted in said grooved track which is capable of sliding between a closed position wherein said drainage holes of said slidable damming plate and said dispenser bottom are not aligned and a open position wherein said drainage holes of said slidable damming plate and said dispenser bottom are aligned so that any viscous liquid in the dispensing container is dispensed via gravity transfer to containers beneath the viscous liquid dispenser when said slidable damming plate is in the open position.

2. The viscous liquid dispenser of claim 1 wherein said dispensing container is comprised of a heat retaining material.

3. The viscous liquid dispenser of claim 1 wherein size of the dispenser container and the multiplicity of drainage holes in the dispenser bottom and the damming plate are configured to dispense liquid to a tray configuration of prepackaged disposable vials.

4. The viscous liquid dispenser of claim 1 wherein size of the dispenser container and the multiplicity of holes in the dispenser bottom and the damming plate are configured to dispense liquid to glass vials stacked in rows in a wire basket.

5. The viscous liquid dispenser of claim 1 wherein size of the dispenser container and the multiplicity of drainage holes in the dispenser bottom and the damming plate are configured to dispense media to bottles stacked in wire baskets.

6. The viscous liquid dispenser of claim 1 wherein size of the dispenser container and the multiplicity of drainage holes in the dispenser bottom and the damming plate are configured to dispense liquid to petri dishes.

7. A viscous liquid dispenser comprising:
   a) a dispensing container having an inside and outside wall, an open top and an interchangeable, removable dispenser bottom;
   b) said interchangeable, removable dispenser bottom having a multiplicity of drainage holes;
   c) a grooved track within said inside wall of said dispensing container parallel to and above said dispenser bottom; and
   d) at least one interchangeable, slidable damming plate having a multiplicity of drainage holes mounted in said grooved track which is capable of sliding between a closed position wherein said drainage holes of said slidable damming plate and said dispenser bottom are not aligned and a open position wherein said drainage holes of said slidable damming plate and said dispenser bottom are aligned.

8. The viscous liquid dispenser of claim 7 wherein said dispensing container is comprised of a heat retaining material.

* * * * *